Sept. 20, 1949.  R. B. COTTON  2,482,705
TIME DELAY AND BRAKE RESETTING MECHANISM
Filed May 21, 1945  4 Sheets-Sheet 1

INVENTOR.
ROBERT B. COTTON
BY
HIS ATTORNEY

Sept. 20, 1949.                R. B. COTTON                2,482,705
                  TIME DELAY AND BRAKE RESETTING MECHANISM
Filed May 21, 1945                                    4 Sheets-Sheet 3

INVENTOR.
ROBERT B. COTTON
BY John A. Robertson
HIS ATTORNEY

Patented Sept. 20, 1949

2,482,705

UNITED STATES PATENT OFFICE 2,482,705

TIME DELAY AND BRAKE RESETTING MECHANISM

Robert B. Cotton, Lansdowne, Pa., assignor to All American Airways, Inc., a corporation of Delaware Application May 21, 1945, Serial No. 595,039

12 Claims. (Cl. 254—173)

This invention relates to mechanism employed in controlling the paying out of a cable from a drum under load conditions and is concerned primarily with devices which initiate application of braking effects after the elapse of a predetermined interval after the drum is started to rotate.

At the present time cable control mechanism of this type is meeting with widespread usage in devices known as "Pick-Up Units" which are mounted in aircraft and which gradually accelerate an originally immovable object to the speed of the moving aircraft. They are also employed in aircraft arresting systems where they function to gradually decelerate the speed of the aircraft. In both of the uses above mentioned and perhaps in others it is highly desirable to provide for the overcoming of the moment of inertia of the drum and cable wound thereon under a condition of free rotation. That is, the initial period of rotation should take place without the retarding effects of brake application. After the speed of rotation of the drum has attained the required degree the brakes should be applied to decelerate paying out of the line with the ultimate result that it is finally stopped.

The foregoing conditions have been recognized by those skilled in the field of air pick-up and the arresting of aircraft and because of this now well accepted need devices known as time delay and brake resetting mechanisms have been provided to attain the desired objective. However, those devices of this type which are now available do not satisfactorily accommodate certain requirements of practical usage particularly ease and simplicity of operation. Accordingly, this invention has in view as its foremost objective the provision, in a unit of the type above noted, of novel and improved time delay and brake resetting mechanism which is operable with a degree of simplicity heretofore unattained.

A unit of this type with which this invention is concerned ordinarily includes a supporting framework in which is journaled a drum which in turn carries a cable. Braking instrumentalities are associated with the drum and spring means is employed as the motivating power which applies the brakes. Inasmuch as the degree of power employed in brake application must vary under different conditions, a further object of the invention is the provision, in a unit of this type of novel and improved means for adjusting the tension of the brake applying spring.

A further object in view is the provision, in a unit of the character noted, of a manually operable lever which is appropriately mounted and operatively connected to the brake spring so that it may be employed to retract the spring from brake applying position. The novel time delay and brake resetting mechanism is associated with this lever so as to release the spring and apply the brakes after the elapse of a predetermined interval.

In carrying out this idea in a practical embodiment a screw shaft is formed with ratchet shaped teeth and cooperating with the shaft is a split nut having teeth complemental to the threads on the shaft. A cam is properly co-related to cause disengagement of the nut from the shaft at a predetermined point if the nut is moved in one direction and engagement with the shaft if the movement is in the opposite direction. The screw shaft is drivably connected with the drum so that after the latter has made a predetermined number of revolutions the nut will disengage from the shaft and thus release the spring to apply the brakes.

A further more detailed object is the provision, in time delay and brake resetting mechanism of the character indicated, of yieldable means for maintaining the nut out of engagement with the shaft after the elapse of the predetermined interval. The presence of this means which may take the form of a spring is important from the safety viewpoint. In making an air pick-up after the object which is being picked up has been accelerated to the speed of the plane the unit is employed to wind in the cable. This means that the drum is rotated in a reverse direction and due to the driving connection with the screw shaft the latter is also rotated in a reverse direction. If the nut should happen to come into effective engagement with the shaft during this period serious damage might result. The provision of the yieldable means prevents this happening. Obviously the tendency of this yieldable means may be overcome when the lever is operated to reset the brake.

Yet another object of the invention is the provision, in time delay and brake resetting mechanism of the type noted, of mechanism for adjusting the time delay interval. In the device provided by this invention the time delay interval is determined by the position of the cam with respect to the screw shaft. Thus, in attaining this objective, means is provided for varying the position of the cam with respect to the shaft.

Various other more detailed objects and advantages of the invention such as arise in connection with carrying out the above noted ideas in a practical embodiment will in part become apparent and in part be hereinafter stated as the description of the invention proceeds.

The invention, therefore, comprises improvements in a cable control unit of the type indicated and which improvements consist essentially of novel means for adjusting the tension on the brake applying spring and a novel and improved time delay and brake resetting mechanism which operates with a high degree of simplicity and assurance.

For a full and more complete understanding of the invention reference may be had to the following description and accompanying drawings wherein.

Figure 1:
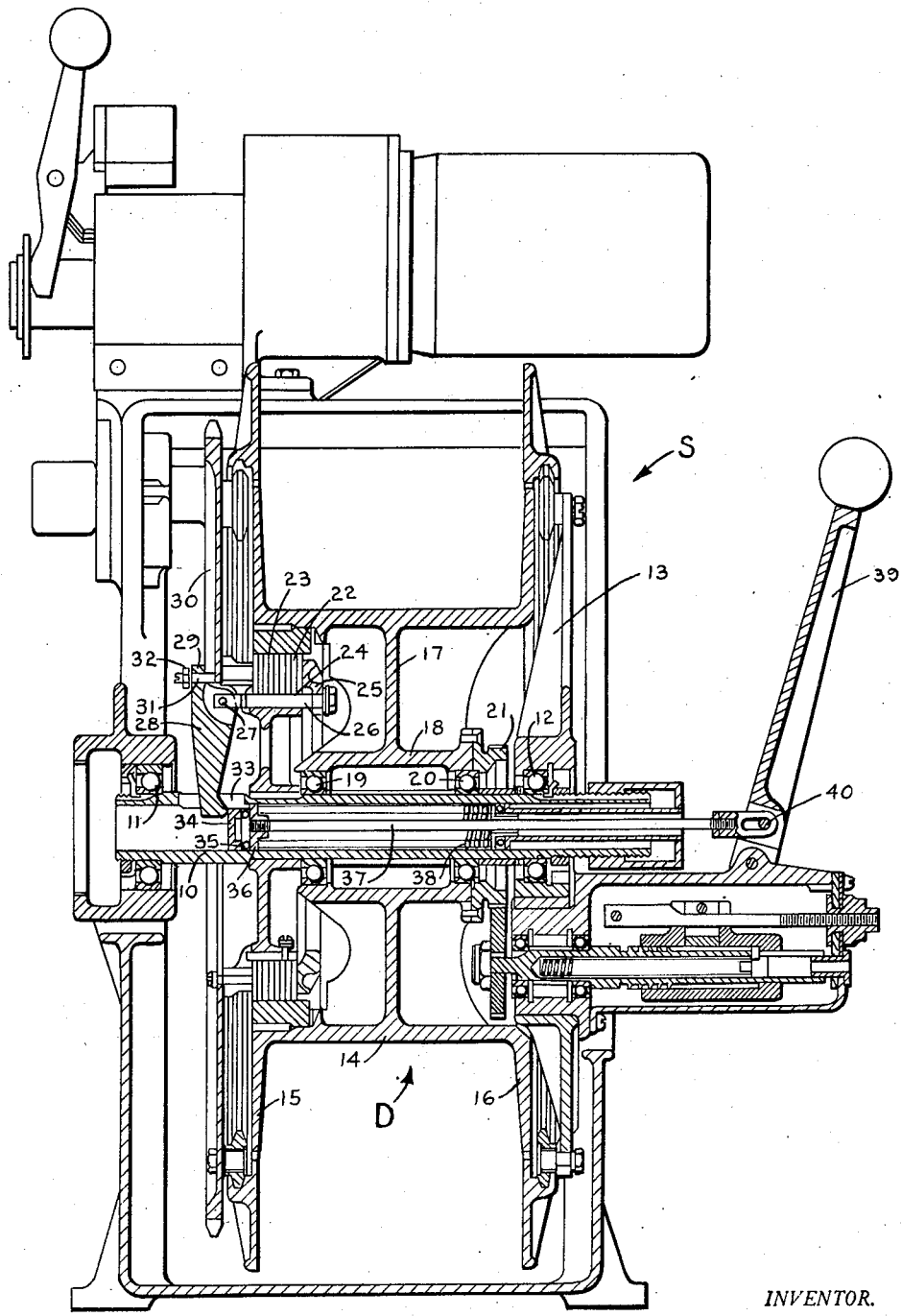
Fig. 1 is a view taken as a vertical section transecting the axis of a cable controlled unit embodying the precepts of this invention.
Figure 2:
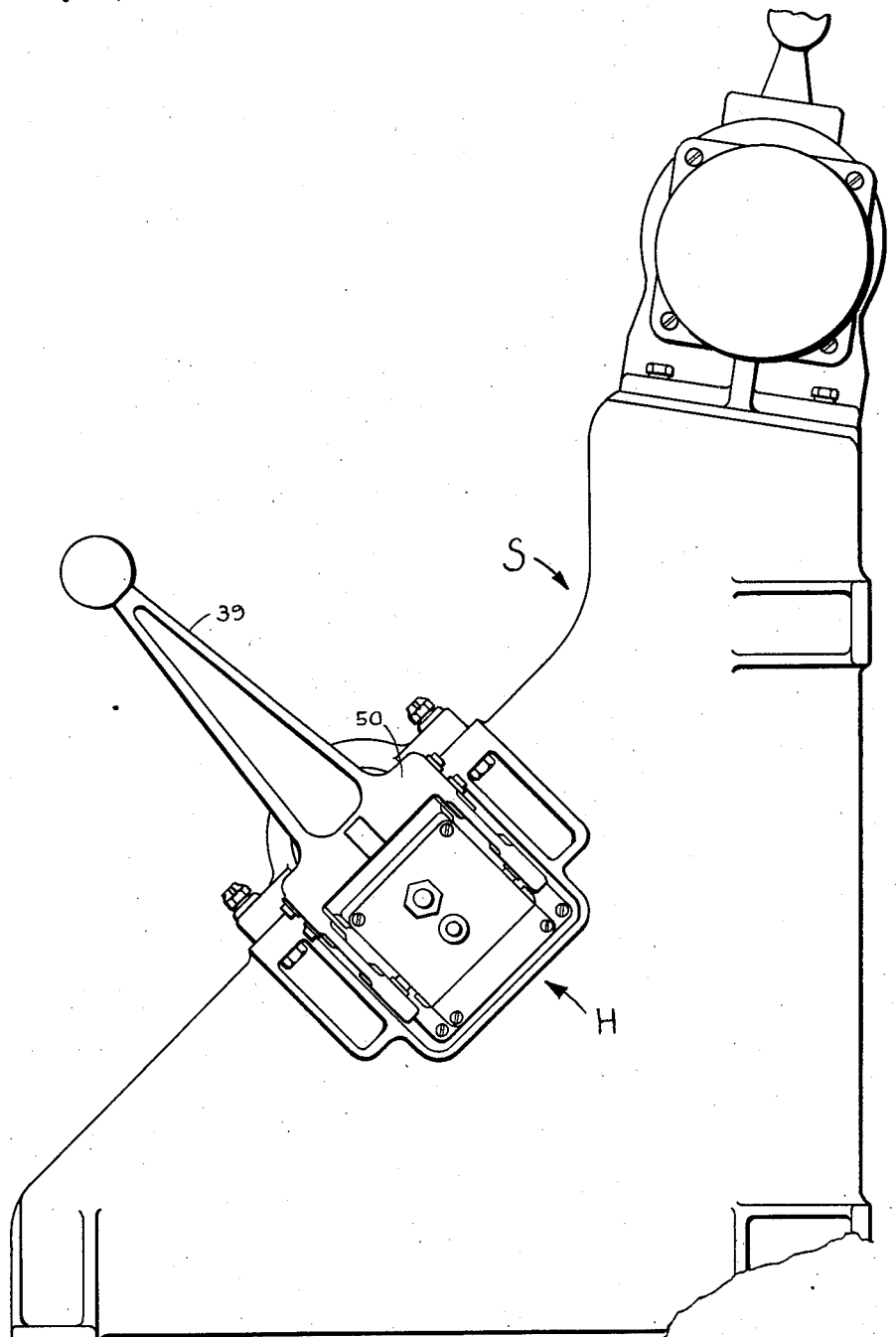
Fig. 2 is a view in end elevation.

Before referring to the drawings it is important to note that a preferred embodiment of the invention is illustrated and described as applied to an air pick-up unit. Obviously the invention is not to be limited to this particular use as its advantages might well be employed any place where it is desired to accurately control the instant of initial application of the brakes in relation to the time when the drum starts to rotate. One example of such use is in the arresting of aircraft where it is also desirable that the drum be first permitted to rotate freely immediately after the time of contact and before application of the brakes.

Referring now to the drawings wherein like reference characters denote corresponding parts and first more particularly to Fig. 1, a supporting framework is referred to in its entirety by the reference character S. A tubular shaft 10 is rotatably mounted in the framework S by a bearing assembly at one end designated 11 and a second bearing assembly 12 adjacent to the other end. It will be noted that the bearing 12 is fitted in a circular plate 13 which also acts as a support for the time delay and brake resetting mechanism as will be later described.

A drum referred to generally as D comprises an outer cylindrical wall 14 which, together with end flanges 15 and 16, define the space which receives the cable (not illustrated). A ring-like web 17 supports the cylindrical wall 14 from an inner hub 18. The latter is journaled on the shaft 10 by bearing assemblies shown at 19 and 20. Co-axially assembled on the hub 18 is a gear 21 which is drivably connected with the hub 18 for a purpose later to be pointed out.

A stack of ring-like friction discs 22 constitute the braking instrumentalities. Every other one of the discs 22 is keyed to the drum D as depicted at 23 while the other alternate discs are similarly keyed to the supporting framework as shown at 24. While each set of disc plates is keyed respectively to the drum and support relative lateral movement between the plates is permitted. Thus, they may be compressed to generate a braking effect or the compression released to permit of free rotation.

A disc bearing plate 25 engages one end of the disc stack and a plurality of bolts 26 (only one of which is illustrated in Fig. 1) have their headed ends anchored to the plate 25 and extend through the stack where the free ends carry pivots 27 on which are mounted operating fingers 28 (only one of which is shown). Each of the fingers 28 has an end projection which is fitted over the circular plate 30 which corresponds to the plate 13 and which is a part of the supporting framework. A threaded stem 31 extends through each of the projections 29 and carries a nut 32 which may be employed to adjust the point of engagement of the end of the stem 31 with respect to the plate 30. The other end of each of the fingers 28 extends through a slot 33 formed in the tubular shaft 10. A follower 34 is slidably received in the bore of the shaft 10 and engages the ends of the fingers 28 therewithin. Immediately adjacent to the follower 34 is a ring 35. A spring retainer 36 is carried at one end of a link 37 and engages a helical expansion spring 38. As is more clearly shown in Fig. 3 the link 37 is continued out beyond the end of the shaft 10 where it is anchored to a manually operable lever 39 by a pin and slot connection designated 40.

The spring 38 provides the force which urges the discs in stack 22 together to supply the braking effects. To the end of rendering the spring effect adjustable the end of the spring 38 remote from the retainer 36 engages a cup-shaped spring follower 41 through the tubular part of which the link 37 passes. A tubular member 42 extends through the open end of the shaft 10 and at its inner end carries an end ring 43 which is spaced from the end flange of the cup-shaped member 41 by a thrust ring 44. At its outer end the tubular member 42 is secured to an end ring 45 which is formed as a part of a thimble 46 that is screwed onto threads 47 formed on the exterior of the shaft 10.

It is evident that the force which will be supplied by the spring 38 depends on the relative position of the end plate 43. This may be varied by rotating the thimble 46 to move the end wall 43 either inwardly or outwardly. Inward movement causes the brakes to be applied with greater force and outward movement diminishes the brake applying force.

The circular plate 13 is formed with an opening 48 in which is fitted a housing for the time delay and brake resetting mechanism. This housing is designated generally H and includes a top wall 49 on which is pivoted a yoke 50 formed at the lower end of the lever 39. The housing H also includes an outer end wall 51, a bottom 52 and an inner wall 53 which is formed with a tubular extension 54 that is received in the opening 48.

A shaft 55 is shown as journaled in the tubular extension 54 by bearing assemblies 56. This shaft 55 is cored out for the greater part of its length to provide a bore 57. At the outer or free end of the shaft 55 the bore 57 receives a short tubular extension 58 which is anchored in the outer end wall 51 and which serves as a journal support for this end of the shaft. The inner end of the shaft 55 drivably carries a pinion 59 which meshes with the gear 21 so as to be driven thereby. A nut shown at 60 serves to maintain the pinion 59 assembled on the shaft 55.

For an appreciable length within the housing H the shaft 55 is formed with ratchet-shaped threads 61. The formation of these threads is clearly illustrated in Figs. 3 to 7 inclusive and each thread is characterized as having a long inclined surface 62 together with a sharp shoulder 63 that is substantially normal to the axis of the shaft, there being a ring-like apex 64 between each of the surfaces 62 and 63.

A split nut assembly is referred to in its entirety by the reference character N. The nut assembly N comprises a main body part 65 which encircles the threads 61 on shaft 55 but does not mesh therewith. Extending from each side of the main body part 65 is a trunnion 66 which is received in a recess (shown in dotted lines in Fig. 3) formed in the lower free end of the yoke 50. It is evident that the lever 39 may be actuated to cause movement of the yoke 50 and thus cause a corresponding movement of the main body part 65 and the nut assembly N.

Upstanding from the main body part 65 is an upwardly extending hollow extension 67 which provides an open space or interruption in that part of the member 65 which encloses the threads 61. This space is substantially semi-cylindrical in formation and received therein is a nut element 68 having threads 69 that are complemental to the threads 61. This nut element 68, is due to the ratchet formation of the threads 61, adapted to ride over the threads on inward movement, that is movement to the left speaking with reference to the showings of the Figs. 3, 5, 6, and 7 or to the right in accordance with the illustration in Fig. 4. However, relative movement in the opposite direction may be accomplished only by rotating the shaft 55.

The nut element 68 at each side carries upwardly extending side parts 70 and 71 (see Figs. 8 and 9) and these side parts 70 and 71 define a recess 72 which is in alignment with similar recesses formed in the upward extension 67. A cam follower 73 is rotatably mounted on a pin 74 that is anchored at each end in the side parts 70 and 71. This cam follower 73 bridges the space 72. A cam bar 75 is positioned in the recess 72 and the recesses in the upward extension 67 in alignment therewith and has an upper surface engaged by the cam follower 73. At the inner end the bar 75 is widened to provide a cam surface 76 which is adapted for engagement by the cam follower 73.

The outer end portion of the bar 75 is of cylindrical shape and threaded as shown at 77 and this end portion extends through an opening 78 formed in the outer wall 51. A nut 79 is screwed onto the threads 77 and is formed with an annular recess 80 which receives the edge of the outer wall 51 which defines the opening 78. Thus, the nut 79 may be rotated to adjust the position of the cam surface 76.

Figures 8, 9:
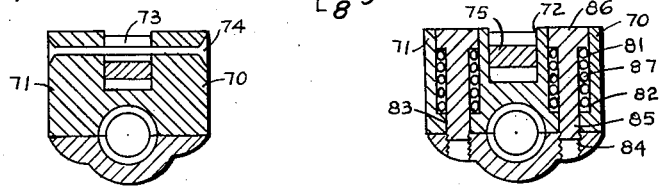
Fig. 8 is an enlarged detailed sectional view taken about on the plane represented by the line 8—8 of Fig. 7.
Fig. 9 is another similar sectional view taken about on the plane represented by the line 9—9 of Fig. 7.

Referring now more particularly to Fig. 9 it will be noted that each of the side parts 70 and 71 is formed with a cylindrical bore 81 that terminates in a shoulder 82. From the shoulder 82 a smaller opening 83 is formed and which passes completely through the nut 68. In alignment with the openings 83 and formed in the main body part 65 are a pair of threaded sockets 84.

Positioned in each of the bores 81 is a bolt 85 that has its threaded end screwed into the respective socket 84. Each bolt 85 has a head 86 and an expansion coil spring 87 is interposed between each head 86 and shoulder 82. These coiled springs 87 serve to yieldably maintain the nut element 68 in a depressed or thread engaging position.

The inner end of the bar 75 may carry a cross pin or projection 88 which prevents the bar from being completely withdrawn through the recess 72 and the other recesses in the extension 67.

Figure 3:
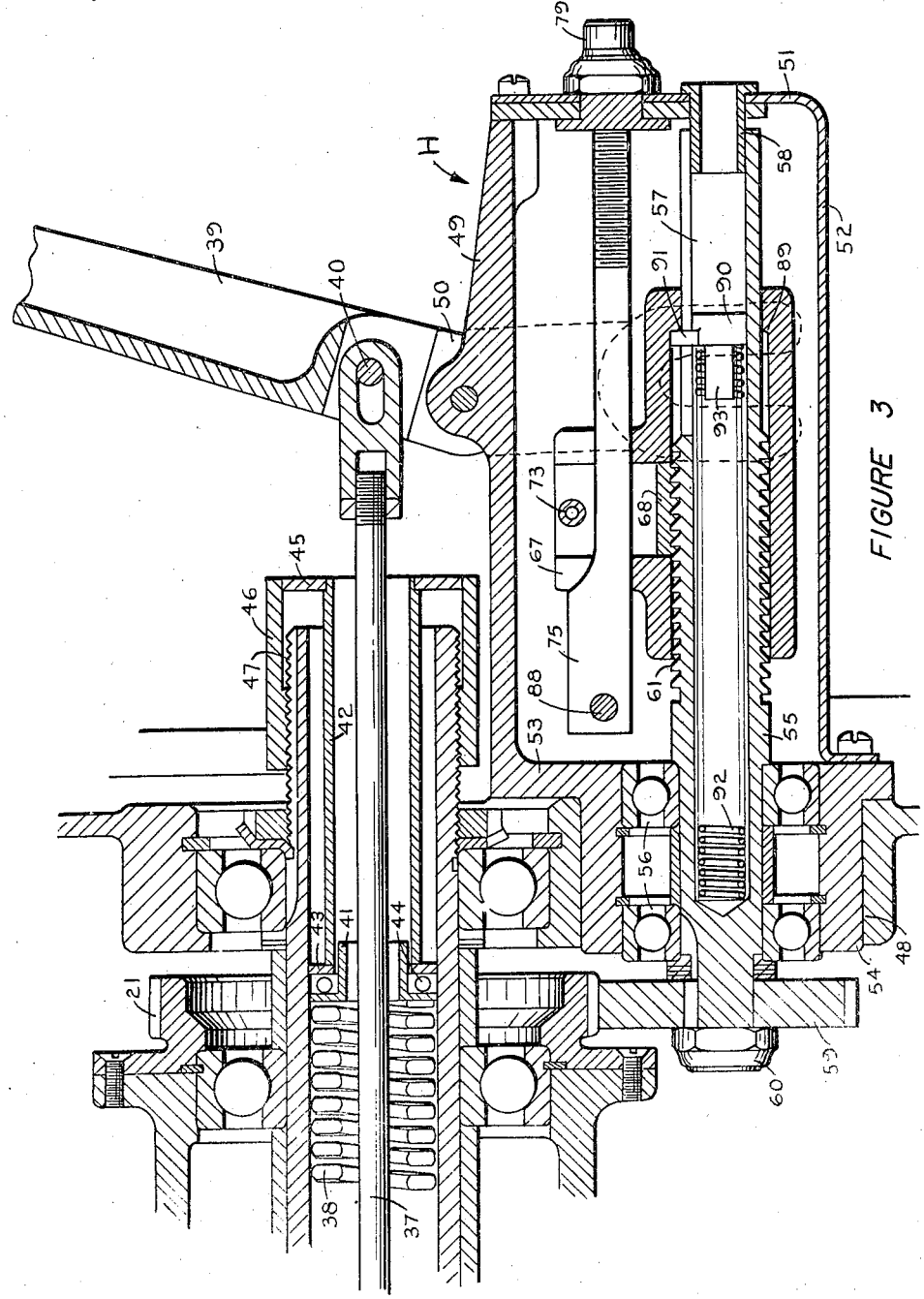
Fig. 3 is an enlarged detailed sectional view through the time delay and brake resetting mechanism together with the brake spring adjusting means.
Figure 4:
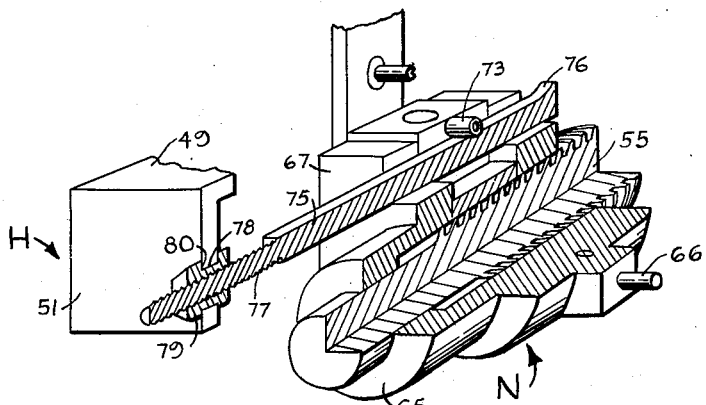
Fig. 4 is an enlarged detailed perspective of a portion of the time delay and brake resetting mechanism with parts cut away and shown in section to more closely bring out the features of construction.
Figure 5:
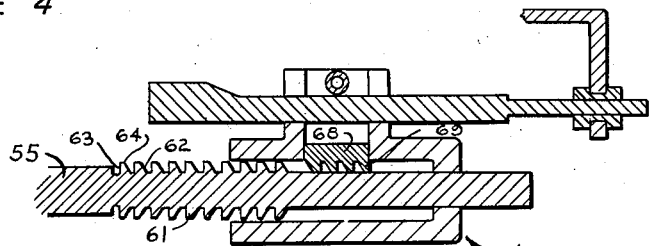
Fig. 5 is an enlarged detailed sectional view looking from the side and developing certain parts of the time delay and brake resetting mechanism.
Figure 6:
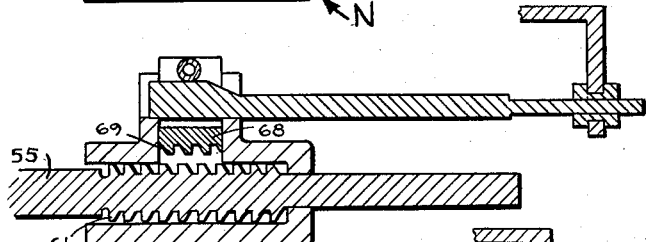
Fig. 6 is a sectional view similar to Fig. 5 bringing out another position of the parts.
Figure 7:
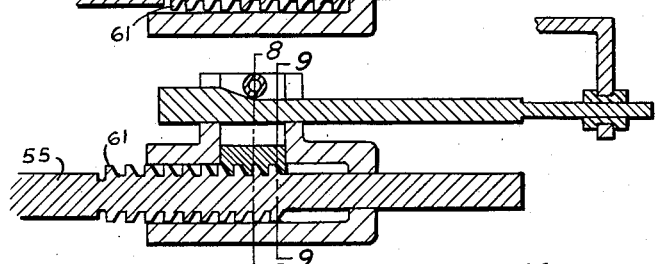
Fig. 7 is another sectional view similar to Figs. 5 and 6 bringing out still another position of the parts.

Referring now more particularly to Fig. 3 it will be noted that the outer end of the tubular part 65 of the nut assembly N is formed with an annular shoulder 89. A slide 90 is positioned in the bore 57 of the threaded shaft 55 and this slide 90 carries a projection 91 which extends through a slot in the shaft 55 and engages the shoulder 89. An expansion coil spring 92 is positioned in the bore 57. This spring 92 bears at one end against the closed end of the bore and at the other end is fitted over a projection 93 carried by the slide 90. Thus, the spring 92 constantly exerts a tendency to move the nut assembly N outwardly. This is important because once the threads of nut element 68 have become disengaged from the threads 61, the disengagement is maintained by this spring 92.

Mode of operation

Prior to actual use of the unit the thimble 46 is adjusted to set up a desired amount of brake applying pressure in the spring 38. That is, the thimble 46 is rotated to move the end ring 43 either inwardly or outwardly as the occasion requires to provide a desired adjustment in the pressure of spring 38. The nut 79 will also be availed of to adjust the bar 75 to properly position the cam surface 76 so as to determine the particular interval of time delay required. Thus, if the bar 75 is moved inwardly the time delay period is increased whereas if it is moved outwardly it is shortened. With these parts properly adjusted the operator grasps the lever 39 and imparts a clockwise motion thereto. The yoke 50 is correspondingly moved and through the connections of the trunnions 66 which project through slots in the side walls of the housing H the nut assembly N is moved inwardly. This inward movement is accommodated because of the ratchet construction of threads 61 and 69. The springs 87 yield and permit the nut element 68 to raise and ride over the threads 61.

As the inward movement is continued the cam follower 73 engages the cam surface 76 and further raises the nut element 68 out of engagement with the threads 61. When the lever 39 is released the springs 87 depress the nut element 68 and this member moves downwardly and back into engagement with the threads 61. The point of this engagement being determined by the position of the cam surface 76. As the drum D starts to rotate the gear 21 is driven thereby and in turn drives the pinion 59. This pinion 59 rotates the shaft 55 thereby turning the threads 61. As these threads are turned through the inter-engagement with the threads 69 of the element 68 the nut assembly N is moved outwardly, thus imparting a counter-clockwise rotation to the yoke 50 and lever 39.

On the initial clockwise rotation of the lever 39 through the pin and slot connection 40 the link 37 is pulled to compress the spring 38 and keep it out of effective engagement with the devices which apply pressure to the disc stack 22. However, on clockwise rotation this link is gradually released and at the point where the nut element 68 completely rides off the thread 61 the spring 38 becomes effective to apply pressure on the stack 22. After the nut element 68 rides off the thread 61 the spring 92 becomes effective through the slide 90 and projection 91 to maintain the disengaged condition. Thus, when the drum D is later rotated in a reverse direction to wind in the cable there is no possibility of damage due to any engagement between the nut element 68 and threads 61.

While a preferred specific embodiment of the invention is hereinbefore set forth, it is to be clearly understood that the invention is not to be limited to the exact construction illustrated and described because various modifications of these details may be provided in putting the invention into practice within the purview of the appended claims.

What is claimed is:

1. In apparatus for controlling the paying out of a cable from a drum, a tubular shaft on which said drum is rotatably mounted, braking instrumentalities associated with said drum for decelerating rotation thereof, a brake applying spring within said tubular shaft, operating connections between said spring and said braking instrumentalities, and mechanism for varying the effective brake applying force of said spring, said mechanism comprising a tubular member disposed within said shaft and having its inner end in thrust relation with respect to said spring, means formed with an aperture carried by said tubular member adjustably connected with an extended end of said shaft to vary the position of said tubular member and manually controlled means for releasing said braking instrumentalities extending concentrically through said tubular members and the said apertured means.

2. In apparatus for controlling the paying out of a cable from a drum, a tubular shaft on which said drum is rotatably mounted, braking instrumentalities associated with said drum for decelerating rotation thereof, a brake applying spring within said tubular shaft, operating connections between said spring and said braking instrumentalities, and mechanism for varying the effective brake applying force of said spring, said mechanism comprising a spring follower engaging the end of said spring, a tubular member within said tubular shaft having one end engaging said spring follower and the other end projecting beyond the end of said shaft, threads on the exterior of said tubular shaft adjacent to the end thereof, and a sleeve in threaded engagement with said threads and operatively connected to said tubular member whereby adjustment of said sleeve causes a corresponding variation in the position of said tubular member.

3. In apparatus for controlling the paying out of a cable from a drum, a tubular shaft on which said drum is rotatably mounted, braking instrumentalities associated with said drum for decelerating rotation thereof, a brake applying spring within said tubular shaft, operating connections between said spring and said braking instrumentalities, and mechanism for varying the effective brake applying force of said spring, said mechanism comprising a spring follower engaging the end of said spring, a tubular member within said tubular shaft having its inner end in effective engagement with said spring follower and its outer end projecting beyond the free end of said shaft, said shaft being exteriorly threaded, a sleeve having a threaded portion meshing with the threads on said shaft, and an end ring connecting said sleeve and tubular member.

4. In apparatus for controlling the paying out of a cable from a drum, a tubular shaft on which said drum is rotatably mounted, braking instrumentalities associated with said drum for decelerating rotation thereof, a brake applying spring within said tubular shaft, operating connections between said spring and said braking instrumentalities, and mechanism for varying the effective brake applying force of said spring, said mechanism comprising a cup-shaped ring follower having a cylindrical portion, an end ring disposed about said cylindrical portion, a thrust ring interposed between the base of said follower and said end ring, a tubular member having its inner end anchored to said end ring, the outer end portion of said shaft being exteriorly threaded, a sleeve having inner threads complemental to the threads on said shaft and meshing therewith, and a ring joining the outer end of said tubular member and sleeve whereby adjustment of said sleeve with respect to said shaft causes a corresponding adjustment of said tubular member within the shaft and said spring follower.

5. In apparatus for controlling the paying out of a cable from a drum, braking instrumentalities operatively associated with said drum and including a brake applying spring, a link normally maintaining said spring out of brake applying position, and mechanism for releasing said link to render said spring effective after the completion of a predetermined number of revolutions of said drum, said mechanism comprising a rotatably mounted shaft formed with ratchet shaped threads, driving connections between said drum and said shaft, a split nut assembly including a nut element having threads complemental to said ratchet threads and normally in engagement therewith, a cam follower connected to said nut element, cam means adapted for engagement by said follower to disengage said nut element from the threads of said shaft, and a connection between said link and said split nut assembly.

6. In apparatus for controlling the paying out of a cable from a drum, braking instrumentalities operatively associated with said drum and including a brake applying spring, a link normally maintaining said spring out of brake applying position, and mechanism for releasing said link to render said spring effective after the completion of a predetermined number of revolutions of said drum, said mechanism comprising a rotatably mounted shaft formed with ratchet shaped threads, driving connections between said drum and said shaft, a split nut assembly including a nut element having threads complemental to said ratchet threads and normally in engagement therewith, a cam follower connected to said nut element, cam means adapted for engagement by said follower to disengage said nut element from the threads of said shaft, a connection between said link and said split nut assembly, and means for adjusting the position of said cam means.

7. In apparatus for controlling the paying out of a cable from a drum, braking instrumentalities operatively associated with said drum and including a brake applying spring, a link normally maintaining said spring out of brake applying position, and mechanism for releasing said link to render said spring effective after the completion of a predetermined number of revolutions of said drum, said mechanism comprising a rotatably mounted shaft having ratchet shaped threads, gears for driving said shaft from said drum, a split nut assembly encompassing said shaft and including a nut element having ratchet shaped threads complemental to the threads on said shaft, and normally in engagement therewith, yieldable means normally maintaining said nut element in engagement with said ratchet threads, a bar formed with a cam surface, a cam follower operatively connected to said nut element and adapted to engage said cam surface to disengage said nut element from said ratchet threads, means for adjusting said bar to vary the position of said cam surface, and operative connections between said split nut assembly and said link.

8. In apparatus for controlling the paying out of a cable from a drum, braking instrumentalities operatively associated with said drum and including a brake applying spring, a link normally maintaining said spring out of brake applying position, and mechanism for releasing said link to render said spring effective after the completion of a predetermined number of revolutions of said drum, said mechanism comprising a rotatably mounted shaft having ratchet shaped threads, gears for driving said shaft from said drum, a split nut assembly encompassing said shaft and including a nut element having ratchet shaped threads complemental to the threads on said shaft, and normally in engagement therewith, yieldable means normally maintaining said nut element in engagement with said ratchet threads, a bar formed with a cam surface, a cam follower operatively connected to said nut element and adapted to engage said cam surface to disengage said nut element from said ratchet threads, means for adjusting said bar to vary the position of said cam surface, a pivotly mounted yoke, a hand lever operatively connected to said yoke, a pin and slot connection between said lever and said link, and means for operatively connecting the arms of said yoke to said split nut assembly.

9. In time delay and brake resetting mechanism for a brake controlling rotation of a drum, a shaft driven from said drum, ratchet shaped threads on said shaft, a split nut assembly encompassing said shaft and including a nut element having ratchet shaped teeth complemental to and normally in engagement with said teeth on said shaft, a brake actuating spring, operating connections between said split nut assembly and said spring, cam means for disengaging said nut element from said threads at a predetermined point depending on the position of said cam means, and means for maintaining said nut element out of engagement with said threads after it has ridden thereoff due to relative rotation of said shaft and split nut assembly.

10. In time delay and brake resetting mechanism for a brake controlling rotation of a drum, a shaft driven from said drum, ratchet shaped threads on said shaft, a split nut assembly encompassing said shaft and including a nut element having ratchet shaped teeth complemental to and normally in engagement with said teeth on said shaft, a brake actuating spring, operating connections between said split nut assembly and said spring, cam means for disengaging said nut element from said threads at a predetermined point depending on the position of said cam means, and a spring disposed within said shaft and engaging said split nut assembly to maintain disengagement of said nut element with said threads after the nut element has ridden off the threads.

11. In combination, a tubular shaft, a drum journaled on said shaft, braking instrumentalities operatively associated with said drum, a brake applying spring within said shaft, operative connections between said spring and said brake instrumentalities, a link disposed within said spring and adapted to cooperate therewith to maintain said spring out of brake applying position, a gear on said drum, a second tubular shaft, a pinion on said second shaft meshing with said gear, ratchet shaped teeth on said second tubular shaft, a split nut assembly encompassing said second tubular shaft and including a nut element having ratchet teeth complemental to and in engagement with the ratchet teeth on said shaft, spring means normally urging said nut element into engagement with said threads, a bar formed with a cam surface, a cam follower operatively connected to said nut element and adapted for cooperation with said cam surface to disengage said nut element from said threads, and operative connections between said split nut assembly and said link.

12. In combination, a tubular shaft, a drum journaled on said shaft, braking instrumentalities operatively associated with said drum, a brake applying spring within said shaft, operative connections between said spring and said braking instrumentalities, a link disposed within said spring and adapted to cooperate therewith to maintain said spring out of brake applying position, means for adjusting the tension of said spring, a gear on said drum, a second tubular shaft, a pinion on said second shaft meshing with said gear, ratchet shaped teeth on said second tubular shaft, a split nut assembly encompassing said second tubular shaft and including a nut element having ratchet teeth complemental to and in engagement with the ratchet teeth on said shaft, spring means normally urging said nut element into engagement with said threads, a bar formed with a cam surface, adjusting means associated with said bar to vary the effective position of said cam surface with respect to said ratchet threads, a cam follower operatively connected to said nut element and adapted for cooperation with said cam surface to disengage said nut element from said threads, a spring within said second tubular shaft and engaging said split nut assembly to normally exert a tendency to maintain said nut element out of engagement with said threads when said nut element has been unscrewed from said threads, a pivotly mounted yoke having a pair of arms arranged on opposite sides of said split nut assembly, the free end of each arm being slotted, a pin on each side of said split nut assembly received in the slot of each arm, a hand lever operatively connected to said yoke, and a pin and slot connection between said link and said hand lever.

ROBERT B. COTTON.

(References on following page)

REFERENCES CITED

The following references are of record in the file of this patent:

UNITED STATES PATENTS

| Number | Name | Date |
|---|---|---|
| 1,313,719 | Miller | Aug. 19, 1919 |
| 1,347,785 | Libby | July 27, 1920 |
| 1,697,084 | Pickel | Jan. 1, 1929 |
| 2,217,464 | Arnold | Oct. 8, 1940 |
| 2,373,414 | Plummer | Apr. 10, 1945 |
| 2,433,488 | Schultz | Dec. 30, 1947 |